United States Patent [19]
Hulsbosch et al.

[11] 3,872,328
[45] Mar. 18, 1975

[54] CIRCUIT ARRANGEMENT HAVING A PLURALITY OF TOUCH CONTACTS

[75] Inventors: Cornelis Jozef Hulsbosch; Tjeerd Pieter van der Zee, both of Emmasingel, Eindhoven, Netherlands

[73] Assignee: U.S. Philips Corporation, New York, N.Y.

[22] Filed: Aug. 20, 1973

[21] Appl. No.: 389,678

[30] Foreign Application Priority Data

Aug. 25, 1972 Netherlands ........................ 7211592

[52] U.S. Cl. .............. 307/308, 307/223 R, 307/320, 334/15

[51] Int. Cl. .......................... H03k 27/00, H03j 1/00

[58] Field of Search ................ 307/223 R, 308, 320; 334/15

[56] References Cited

UNITED STATES PATENTS

| | | | |
|---|---|---|---|
| 3,047,817 | 7/1962 | Schneider | 307/223 R |
| 3,503,018 | 3/1970 | Cavanagh | 334/15 |
| 3,596,183 | 7/1971 | Spies | 334/15 X |
| 3,652,960 | 3/1972 | Sakamoto et al. | 334/15 |
| 3,746,886 | 7/1973 | Konopka | 334/15 X |

*Primary Examiner*—John Zazworsky
*Attorney, Agent, or Firm*—Frank R. Trifari; Henry I. Steckler

[57] ABSTRACT

A circuit arrangement having contacts which can be operated, a ring counter having outputs corresponding to the contacts and for each contact a gating circuit controlled by this contact and the corresponding ring counter output. When the contact is operated the corresponding gating circuit supplies a signal which causes the ring counter to count until the position of the ring counter is in conformity with the operated contact.

6 Claims, 3 Drawing Figures

CIRCUIT ARRANGEMENT HAVING A PLURALITY OF TOUCH CONTACTS

The invention relates to a circuit arrangement having a plurality of touch contacts and outputs corresponding thereto, in which in response to an instantaneous operation of one of the contacts the output corresponding thereto continuously assumes an operating condition and the other outputs assume a rest condition, the circuit arrangement comprising a ring counter having outputs constituting the said outputs of the circuit arrangement.

Such a circuit arrangement is known, for example, from the magazine Funkschau, 1971, No. 17, pages 1657 – 1662 and may be used for a wide range of applications. Some examples of application are:

the selection of a given receiver tuning from a number of pre-set receiver tunings in a radio or television receiver, the selection of a given rotational speed or of a given tape speed in a record player or tape recorder and generally the activation of a given device or the selection of a given condition from a plurality of different, but generally similar devices or conditions.

Generally such circuit arrangements include a memory element for each contact, for example, a bistable multivibrator or a gas-filled tube which on touching the relevant contact changes over to the operating condition. A mutual locking device is then used to bring any other storage element, previously in the operating condition, to the rest condition.

It is known from the above-mentioned magazine Funkschau to use an integrated ring counter having a plurality of outputs of which every time a different combination is in the operating condition (binary counter). A decoder which is likewise integrated and is controlled by the binary counter has a plurality of outputs only one of which is in the operating condition. An integrated multiplexer which compares the output signals from the binary counter with the output signals from the contacts interrupts the supply of counting pulses to the ring counter in case of conformity between the two output signals. These counting pulses are derived from the source voltages which are induced by touching the contacts and for which purpose the output voltages of all contacts are combined in a fourth integrated circuit. As a result the counting frequency is only 50 Hz (relatively slow switching). Finally a transistor amplifier is present for each contact which amplifies the generated signal to the required level when the contacts are touched.

An object of the invention is to provide a circuit arrangement which is likewise based on the principle of a ring counter operating stepwise when one of the contacts is touched and coming to a halt as soon as the position of the ring counter is in conformity with the contact which is touched. However, an object of the invention is to realize this principle with very few circuit elements and the circuit arrangement according to the invention is to this end characterized by a number of gates which are each controlled by one of the contacts and the corresponding output of the ring counter and are able to supply a gate-output signal if the contact connected thereto is operated and the ring counter output connected thereto is in the rest condition, and means controlled by said gates for applying counting pulses to the ring counter if and as long as one of the said gates supplies the said gate-output signal.

A very simple circuit arrangement is obtained when using a ring counter whose outputs in the rest condition have a high resistive connection to ground and in the operating condition have a low resistive connection to ground. For example, for the selection of one out of a number of preset receiver tunings the pre-set tuning potentiometers and indicator lamps commonly used therefor can be connected to the outputs directly or through a switching transistor. The said gates may then also be realized in a very simple manner by means of a single diode which causes the control current produced by touching the corresponding contact to be depleted to ground when the corresponding ring counter output is in the operating condition whereas, when this ring counter output is in the rest condition, this current cannot be depleted to ground and then automatically applies counting pulses or causes counting pulses to be applied to the ring counter.

The invention will be further described with reference to the Figures shown in the drawing.

Figures 1, 2, 3:
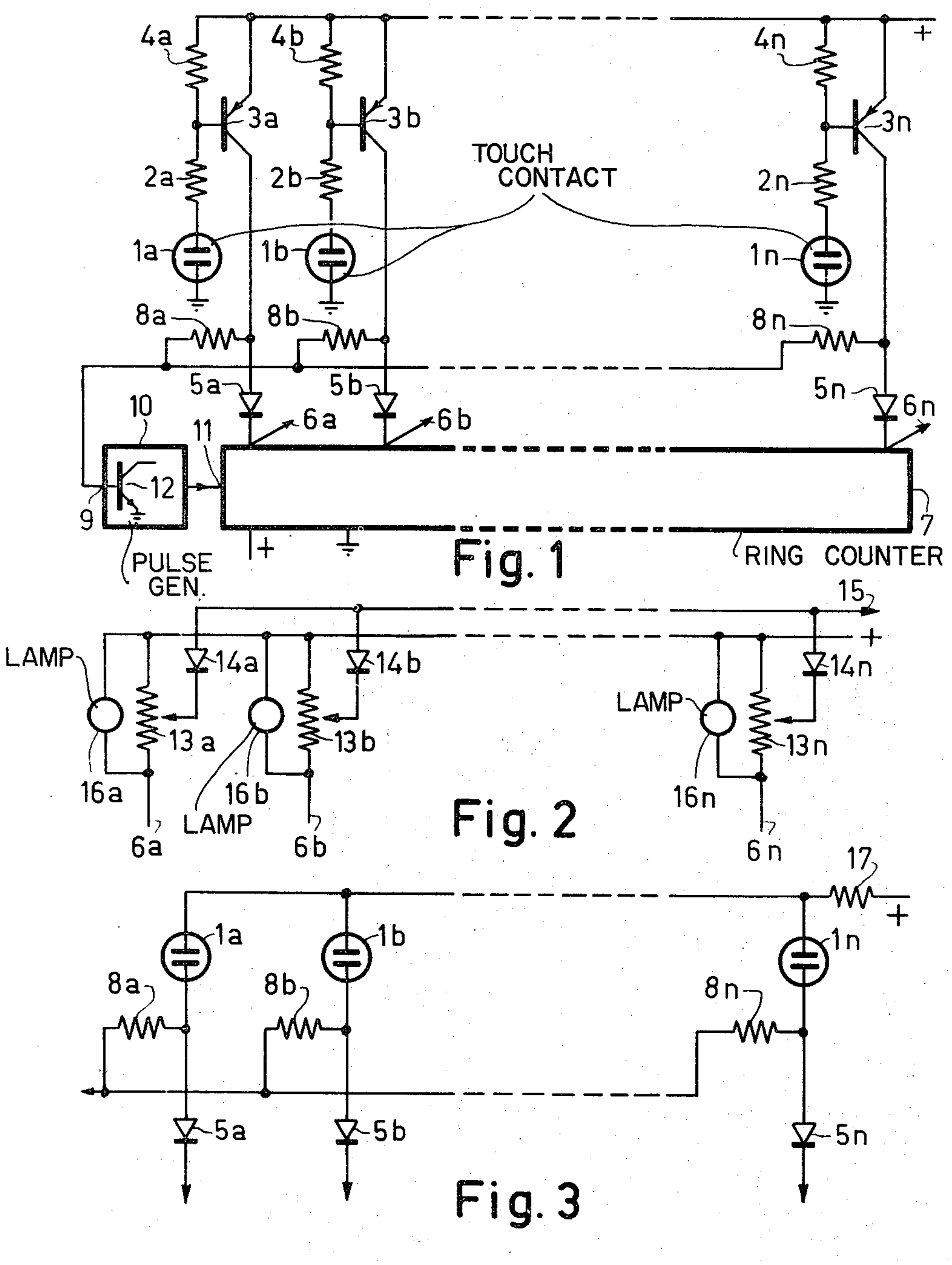
FIG. 1 shows an embodiment of a circuit arrangement according to the invention.
FIG. 2 shows a known arrangement, connectable to the circuit arrangement of FIG. 1, for presetting receiver tunings in a receiver
FIG. 3 shows a detailed modification of the embodiment of FIG. 1.

In FIG. 1 the references $1_a, 1_b \ldots 1_n$ show a number of contacts which can be operated when touched. These contacts may generally consist of push-buttons, single fixed conductors on which a hum voltage is induced when being touched or by which a capacitance variation is produced upon touching or, as is shown in FIG. 1, by two fixed conductors between which an impedance variation is brought about when they are fingertip-operated. The contacts are each connected through resistors $2_a, 2_b \ldots 2_n$ to the base electrodes of transistors $3_a, 3_b \ldots 3_n$ and furthermore through resistors $4_a, 4_b \ldots 4_n$ to the positive terminal (+) of a voltage supply source. The emitter electrodes of these transistors are likewise connected to this positive terminal.

The collector electrodes of the transistors 3 are each connected through blocking diodes $5_a, 5_b \ldots 5_n$ to outputs $6_a, 6_b \ldots 6_n$ of a ring counter 7. The outputs $6_a, 6_b \ldots 6_n$ also constitute the outputs of the arrangement. The collector electrodes of the transistors $3_a, 3_b \ldots 3_n$ are also jointly connected to a control input 9 of a pulse generator 10 through blocking resistors $8_a, 8_b \ldots 8_n$. The pulses from this pulse generator are applied to a trigger input 11 of the ring counter for causing this ring counter to count.

Every time one of the outputs $6_a, 6_b \ldots 6_n$ of the ring counter is in the operating condition, it constitutes a short circuit to ground. All other outputs are in the rest condition and constitute an open circuit to ground. When none of the contacts 1 is touched, the base electrodes of all transistors 3 receive a positive bias through the resistors 4 so that all transistors 3 are cut off. This implies that no current is applied to the control input 9 of the pulse generator 10 (through one of the resistors $8_a, 8_b \ldots 8_n$). The pulse generator includes a control transistor 12 which consequently does not convey any current and this results in the pulse generator 10 being inactive and consequently it does not apply any pulses to the ring counter 7. The ring counter retains its original position, that is to say, the output which is in the operating condition retains this condition and the other outputs remain in the rest condition.

A ring counter is preferably used which upon energization of the circuit arrangement always assumes the same condition, for example, the output $6_a$ in the operating condition.

When, for example, contact $1_n$ is operated the base voltage of transistor $3_n$ becomes less positive so that a collector current starts to flow through this transistor. This collector current cannot be depleted to ground via diode $5_n$ and ring counter output $6_n$ because this output is still in the rest condition and is therefore highly resistive. The collector current from transistor $3_n$ will therefore flow through the resistor $8_n$ to the base of the transistor 12 and will render this transistor conducting. As a result the pulse generator 10 will be activated and it will cause the ring counter to change over stepwise. Successively the outputs $6_b$, $6_c$, $6_d$ etc. thus come in the operating condition. This stepwise operation of the ring counter continues until the output $6_n$ comes in its operating condition. This output then constitutes a low resistive connection to ground so that the collector current from transistor $3_n$ can flow to ground via the diode $5_n$ and ring counter output $6_n$. In that case no current flows any longer through the resistor $8_n$ to the base electrode of the transistor 12. This transistor is cut off, the pulse generator 10 is rendered inactive and the ring counter remains in its newly chosen condition with the output $6_n$ in the operating condition even when subsequently the contact $1_n$ is released.

It will be evident that the pulse repetition frequency of the pulse generator 10 is preferably to be chosen sufficiently high (for example 7 kHz) so as to ensure that even during a very short period of touching of one of the contacts the ring counter which is to assume the new position actually reaches this position. If each of the contacts consists of a single touch electrode the hum voltage induced thereon when touching the contact can then also be utilized for causing the ring counter to change over stepwise. When the corresponding contact is touched, the transistor 3 then supplies a pulsatory collector current which is depleted to ground through the ring counter when the ring counter is in the corresponding position. When the ring counter is, however, not in the corresponding position, this pulsatory collector current flows through the relevant blocking impedance 8 and may then directly control the counting input 11 of the ring counter. A pulse generator for generating counting pulses is then superfluous. The stepping frequency is then, however, only 50 Hz which is generally considered to be too low.

FIG. 2 shows by way of example a device, connectable to the circuit arrangement of FIG. 1, for presetting receiver tunings in a radio or television receiver employing capacity diode tuning. A plurality of potentiometers $13_a$, $13_b$ . . . $13_n$ which can be pre-set is connected at one end to the positive terminal (+) of a preferably stabilized voltage supply source and at the other end to the outputs $6_a$, $6_b$ . . . $6_n$ of the circuit arrangement of FIG. 1. The wipers on the potentiometers are each connected through blocking diodes $14_a$, $14_b$ . . . $14_n$ to, a joint conductor 15 which leads to the capacity diodes of a tuner of the receiver not further shown. Indicator lamps $16_a$, $16_b$ . . . $16_n$ are also connected to the outputs $6_a$, $6_b$ . . . $6_n$ .

Of all potentiometers 13 there is only one connected to ground, namely the potentiometer whose corresponding ring counter output is in the operating condition. Therefore a voltage is present across this one potentiometer and a partial voltage adjusted by means of the wiper on this potentiometer is applied through the lead 15 to the capacity diodes. The blocking diodes 14 prevent this voltage from being influenced by the other potentiometers. The ring counter output in the operating condition also connects the corresponding indicator lamp 16 to ground so that this lamp lights up.

It is to be noted that the blocking diodes 5 in the circuit arrangement of FIG. 1 prevent currents from starting to flow through the load elements (the potentiometers 13 and the lamps 16) connected to the ring counter outputs in the rest condition, which currents might activate the pulse generator 10 through the resistors 8.

The circuit arrangement according to the invention is eminently suitable for use in combination with a remote control system. Such a system may supply, for example, a pulse whose duration is a measure of the receiver tuning to be set (pulse duration modulation). In such a case a pulse is firstly applied to a reset input (not further shown) of the ring counter 7 which sets the ring counter to a given initial position (for example, the output $6_a$ in the operating condition) and subsequently the said pulse of variable duration is applied to the input 9 of the pulse generator or the correct number of pulses derived in another manner from the received pulse is applied to the input 11.

When a sufficiently high supply voltage (for example, 100 Volts) is available, the transistors 3 of the circuit arrangement of FIG. 1 may be omitted. The contacts 1 are then directly connected to the junction between the diodes 5 and the resistors 8 (FIG. 3). The opposite connections of the contact are connected through a protection and current limiting resistor 17 to the supply voltage.

What is claimed is:

1. A circuit arrangement having a plurality of touch contacts, and outputs corresponding thereto, in which in response to an instantaneous operation of one of the contacts the output corresponding thereto continously assumes an operating condition and the other outputs assume a rest condition, said circuit arrangement comprising a ring counter having outputs constituting of said outputs of the circuit arrangement, characterized by a number of gates which are each controlled by one of the contact and the corresponding output of the ring counter and are able to supply a gateoutput signal if the contact connected thereto is operated and the ring counter output connected thereto is in the rest condition, and means controlled by said gates for applying counting pulses to the ring counter if and as long as one of the said gates supplies the said gate-output signal.

2. A circuit arrangement as claimed in claim 1 in which the outputs of the ring counter in the rest condition have a high resistive connection and in the operating condition have a low resistive connection to a common reference point (ground), characterized in that each of the gates has a first element connected to the corresponding output of the ring counter through which element a current flows which is generated when the corresponding contact is operated if said output of the ring counter is in the operating condition, as well as a second element through which said current flows to the means for applying counting pulses to the ring counter if said output of the ring counter is in the rest condition.

3. A circuit arrangement as claimed in claim 2, characterized in that the first element is constituted by a diode and the second element is constituted by a resistor.

4. A circuit arrangement for a plurality of touch contacts, said circuit comprising a ring counter having a plurality of output means corresponding thereto for responding to an instantaneous operation of the respective contact and for continuously assuming an operating condition and wherein the other output means assume a rest condition, a number of gate means coupled to and controlled by one of the contacts and the corresponding output of the ring counter for supplying a gate output signal if the contact thereto is operated and the ring counter output coupled thereto is in the rest condition, and means coupled to and controlled by said gates for applying counting pulses to the ring counter if and as long as one of the said gates supplies the said gate-output signal.

5. A circuit arrangement as claimed in claim 4 in which the outputs of the ring counter in the rest condition have a high resistive connection and in the operating condition have a low resistive connection to a common reference point, each of the gates having a first element means coupled to the corresponding output of the ring counter for passing a current which is generated when the corresponding contact is operated if said output of the ring counter is in the operating condition, and a second element means for passing said current to the means for applying counting pulses to the ring counter if said output of the ring counter is in the rest condition.

6. A circuit arrangement as claimed in claim 5, wherein the first element comprises a diode and the second element comprises a resistor.

* * * * *